(12) United States Patent
Choi et al.

(10) Patent No.: US 11,644,030 B2
(45) Date of Patent: May 9, 2023

(54) LINEAR COMPRESSOR

(71) Applicant: LG Electronics Inc., Seoul (KR)

(72) Inventors: Kichul Choi, Seoul (KR); Wooju Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 762 days.

(21) Appl. No.: 16/542,685

(22) Filed: Aug. 16, 2019

(65) Prior Publication Data

US 2020/0080553 A1 Mar. 12, 2020

(30) Foreign Application Priority Data

Sep. 6, 2018 (KR) .................. 10-2018-0106557

(51) Int. Cl.
| | |
|---|---|
| *F04B 53/20* | (2006.01) |
| *F04B 39/16* | (2006.01) |
| *B01D 39/20* | (2006.01) |
| *B01D 39/16* | (2006.01) |
| *B01D 46/10* | (2006.01) |

(Continued)

(52) U.S. Cl.
CPC ............ *F04B 53/20* (2013.01); *B01D 39/16* (2013.01); *B01D 39/2041* (2013.01); *B01D 46/0005* (2013.01); *B01D 46/106* (2013.01); *B32B 5/02* (2013.01); *B32B 27/12* (2013.01); *B32B 27/36* (2013.01); *F04B 39/122* (2013.01); *F04B 39/126* (2013.01); *F04B 39/16* (2013.01); *B01D 46/00* (2013.01); *B01D 46/52* (2013.01); *B01D 2239/0478* (2013.01); *B01D 2275/10* (2013.01); *B01D 2275/202* (2013.01);

(Continued)

(58) Field of Classification Search
CPC combination set(s) only.
See application file for complete search history.

(56) References Cited

U.S. PATENT DOCUMENTS

| | | | |
|---|---|---|---|
| 5,462,586 A | 10/1995 | Sugiyama et al. | |
| 2008/0008610 A1* | 1/2008 | Muth | F04B 39/122 |
| | | | 417/416 |

(Continued)

FOREIGN PATENT DOCUMENTS

| | | |
|---|---|---|
| EP | 2682178 | 1/2014 |
| EP | 2848810 | 3/2015 |

(Continued)

OTHER PUBLICATIONS

JP2011047306 translation (Year: 2022).*
Extended European Search Report in European Application No. 19189568.9, dated Feb. 5, 2020, 3 pages.

*Primary Examiner* — Kenneth J Hansen
*Assistant Examiner* — David N Brandt
(74) *Attorney, Agent, or Firm* — Fish & Richardson P.C.

(57) ABSTRACT

Provided is a linear compressor. The linear compressor includes a cylinder disposed in a shell to define a compression space for a refrigerant, a piston installed to reciprocate in the cylinder, a motor assembly that allows the piston to move in an axial direction of the cylinder and thereby to compress the refrigerant introduced into the compression space, a nozzle which is provided in the cylinder and through which a portion of the refrigerant introduced into the compression space passes, and a cylinder filter installed in the cylinder and disposed at an inlet-side of the nozzle. At least one or more surfaces of the cylinder filter are oil-repellent coated.

10 Claims, 15 Drawing Sheets

(51) Int. Cl.
*B01D 46/00* (2022.01)
*B32B 5/02* (2006.01)
*B32B 27/12* (2006.01)
*B32B 27/36* (2006.01)
*F04B 39/12* (2006.01)
*F04B 39/02* (2006.01)
*F04B 53/18* (2006.01)
*B01D 46/52* (2006.01)
*F04B 35/04* (2006.01)

(52) U.S. Cl.
CPC ....... *B32B 2307/724* (2013.01); *F04B 35/045* (2013.01); *F04B 39/0292* (2013.01); *F04B 53/18* (2013.01)

(56) References Cited

U.S. PATENT DOCUMENTS

| | | | | |
|---|---|---|---|---|
| 2009/0238701 | A1* | 9/2009 | Giacchi | F04B 39/16 137/544 |
| 2014/0283679 | A1* | 9/2014 | Muhle | F04B 53/008 92/143 |
| 2015/0078925 | A1* | 3/2015 | Choi | F04B 39/16 417/228 |
| 2015/0174517 | A1* | 6/2015 | Furuyama | B01D 39/16 55/486 |
| 2017/0321671 | A1* | 11/2017 | Lee | F04B 39/122 |
| 2018/0195502 | A1* | 7/2018 | Ahn | F04B 53/008 |

FOREIGN PATENT DOCUMENTS

| | | | |
|---|---|---|---|
| EP | 2960506 | 12/2015 | |
| JP | 2011047306 | * 3/2011 | ............ B01D 46/00 |
| KR | 20140146165 | 12/2014 | |
| KR | 20170124903 | 11/2017 | |
| KR | 1020180039959 | 4/2018 | |

* cited by examiner

LINEAR COMPRESSOR

CROSS-REFERENCE TO RELATED APPLICATIONS

The present application claims priority under 35 U.S.C. 119 and 35 U.S.C. 365 to Korean Patent Application No. 10-2018-0106557 (filed on Sep. 6, 2018), which is hereby incorporated by reference in its entirety.

BACKGROUND

The present invention relates to a linear compressor.

Generally, a compressor is a mechanical device that receives power from a power generating device Such as an electric motor or a turbine to increase pressure by compressing air, refrigerant or various other operating gases, and are used throughout the household appliance or industry.

Such compressors can be classified into reciprocating compressors, rotary compressors, and scroll compressors Many linear compressors are being developed which can improve the compression efficiency without mechanical loss occurring when the rotary motion of the motor is converted into the linear motion particulary, connecting the piston directly to the driving motor which reciprocates linearly and has a simple structure among the reciprocating compressor.

Generally, the linear compressor is configured to suck and compress the refrigerant while the piston is linearly reciprocated within a cylinder by a linear motor in a closed shell and then discharge the refrigerant.

(Patent Document 1) Korean Patent Publication No. 10-2018-0039959 (Apr. 19, 2018)

In the linear compressor disclosed in prior art document, a gas bearing in which a refrigerant gas is supplied in a space between a cylinder and a piston to perform a bearing function is disclosed. The refrigerant gas flows to an outer circumferential surface of the piston through a nozzle provided in the cylinder to act as a bearing in the reciprocating piston.

To improve compression efficiency of the linear compressor, it is necessary to minimize a consumed amount of refrigerant gas used as a gas bearing. To reduce the consumed amount of refrigerant gas, a diameter of the cylinder nozzle and the number of cylinder nozzles have to be reduced. However, if the diameter of the cylinder nozzle decreases, or the number of cylinder nozzles is reduced, the cylinder nozzle may be blocked to greatly affect reliability of the compressor.

That is, if the diameter of the cylinder nozzle decreases, or the number of cylinder nozzles is reduced, the cylinder nozzle may be blocked by oil or a mixture of the oil and dusts to significantly reduce a function of the gas bearing.

To solve this limitation, according to the prior art document, a thread made of a polyethylene terephthalate (PET) may be wound around a gas inflow part provided on an outer circumferential surface of the cylinder and thus used as a precipitation filter-type filter member.

However, in this case, when the filter is exposed for a long time under the operation conditions of the compressor in which a pressure and a temperature rapidly change, the tension of the filer may be reduced to significantly deteriorate the filtering performance as time elapses. When the filtering performance is significantly deteriorated, the blocking of the cylinder nozzle becomes serious due to the oil or the mixture of the oil and the dusts.

SUMMARY

Embodiments provide a linear compressor including a cylinder filter that is capable of filtering foreign substances contained in a refrigerant gas while adjusting a flow rate of the refrigerant gas used as a gas bearing.

Embodiments also provide a linear compressor which is capable of preventing a nozzle from being blocked while maintaining performance of a gas bearing even though a diameter of the nozzle or the number of nozzles, through which a refrigerant gas is introduced into a cylinder, is reduced.

Embodiments also provide a linear compressor in which foreign substances contained in a refrigerant gas are previously filtered before the refrigerant gas is introduced into a nozzle provided in the cylinder to prevent the nozzle from being blocked.

Embodiments also provide a linear compressor in which blocking of a nozzle is effectively prevented through a simple process without changing a structure of an existing compressor.

In one embodiment, a linear compressor includes: a cylinder configured to define a compression space for a refrigerant; a nozzle which is provided in the cylinder and through which a portion of the refrigerant introduced into the compression space passes; and a cylinder filter installed in the cylinder and disposed at an inlet-side of the nozzle. Here, at least one or more surfaces of the cylinder filter may be oil-repellent coated to filter oil or foreign substances contained in the refrigerant gas by using the filter, thereby preventing the filter from being blocked.

Particularly, a gas inflow part recessed inward from an outer circumferential surface of the cylinder in a radial direction may be provided in the cylinder, and the nozzle may pass from an inner surface of the gas inflow part to an inner circumferential surface of the cylinder.

Here, the cylinder filter may include: a first filter installed inside the gas inflow part; and a second filter installed at an outlet-side of the first filter inside the gas inflow part, wherein a surface corresponding to an inlet-side of the first filter may be oil-repellent coated. Thus, the oil or the foreign substances contained in the refrigerant gas may be effectively filtered, and a flow rate of the refrigerant gas may be adjusted.

Also, the first filter may be disposed to be laminated with the second filter, and an outlet-side of the second filter may be connected to the inlet-side of the nozzle.

For example, the gas inflow part may include: a first recess part recessed inward from the outer circumferential surface of the cylinder in the radial direction; a second recess part further recessed inward from the first recess part in the radial direction, wherein the first filter is disposed in the first recess part, and the second filter is disposed in the second recess part.

The first recess part may extend along the outer circumferential surface of the cylinder in a circumferential direction to provide a circular band shape, and the second recess part may be recessed inward from a central point of a bottom surface of the first recess part in the radial direction.

The first filter may include a metal fiber filter having a plurality of filter holes, and the second filter may include a filter made of a polyethylene terephthalate (PET) material. Thus, the first filter may prevent the second filter from being detached outward from the cylinder.

On the other hand, a gas inflow part passing from an outer circumferential surface to an inner circumferential surface of the cylinder may be provided in the cylinder, and a plate in which the nozzle is provided may be disposed inside the gas inflow part.

Particularly, the gas inflow part may include: a seating groove recessed inward from the outer circumferential surface of the cylinder in a radial direction; and a through-hole passing from the seating groove to the inner circumferential surface of the cylinder, wherein the plate may be seated in the seating groove.

Here, the cylinder filter may be laminated on the plate inside the seating groove, and a surface corresponding to an inlet-side of the cylinder filter may be oil-repellent coated. The cylinder filter may be laminated on the plate inside the seating groove, and a surface corresponding to an outlet-side of the cylinder filter may be oil-repellent coated.

Alternatively, a portion of the refrigerant discharged from the compression space may pass through the cylinder filter and be introduced into the through-hole of the gas inflow part through the nozzle of the plate.

Thus, the cylinder filter may include a metal fiber filter having a plurality of filter holes, and the plate may be made of an engineering plastic material.

Here, the linear compressor may further include: a frame body configured to accommodate the cylinder, the frame body extending in an axial direction; a frame flange extending from the frame body in a radial direction; and a frame extending from the frame flange to the frame body, the frame being provided as a frame connection part having a gas hole therein.

Also, the linear compressor may further include a filter assembly installed at an inlet-side of the gas hole to filter foreign substances of the refrigerant to be introduced into the gas hole, wherein the filter assembly may be installed in a filter groove in which a front surface of the frame flange is recessed backward.

For example, the filter assembly may include: a filter bracket including a refrigerant inlet part and a refrigerant outlet part, the filter bracket having an accommodation space therein; a discharge filter disposed inside the filter bracket, the discharge filter having a lipophilic property; a first support member disposed at an inlet-side of the discharge filter inside the filter bracket; and a second support member disposed at an outlet-side of the discharge filter inside the filter bracket.

Here, a surface corresponding to the inlet-side or outlet-side of the discharge filter may be oil-repellent coated to previously filter the foreign substances contained in the refrigerant gas before the refrigerant gas is introduced into the nozzle provided in the cylinder, thereby preventing the nozzle from being blocked.

For example, the discharge filter may include a first filter contacting the first support member and a second filter disposed at the outlet-side of the first filter to contact the second support member, and a surface corresponding to the inlet-side or outlet-side of the first filter may be oil-repellent coated.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Figure 1:
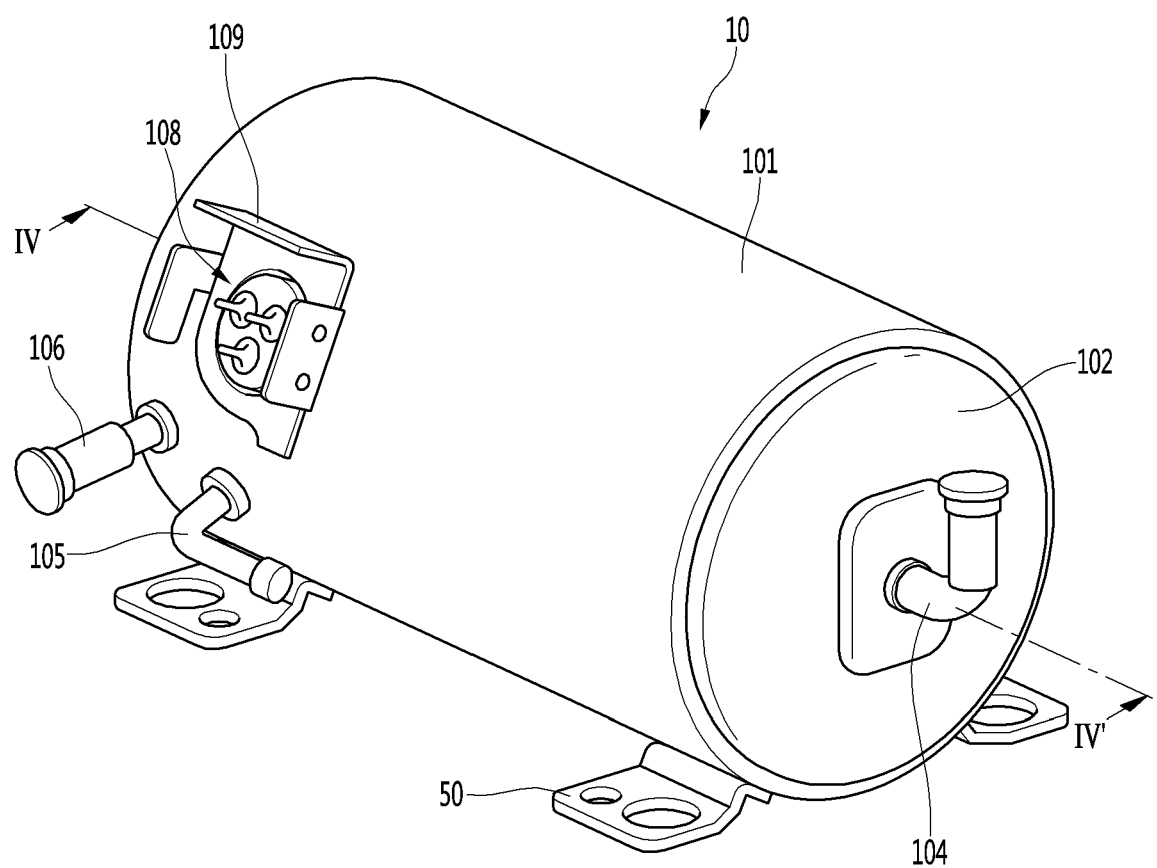
FIG. 1 is a perspective view of a linear compressor according to a first embodiment.
Figure 2:
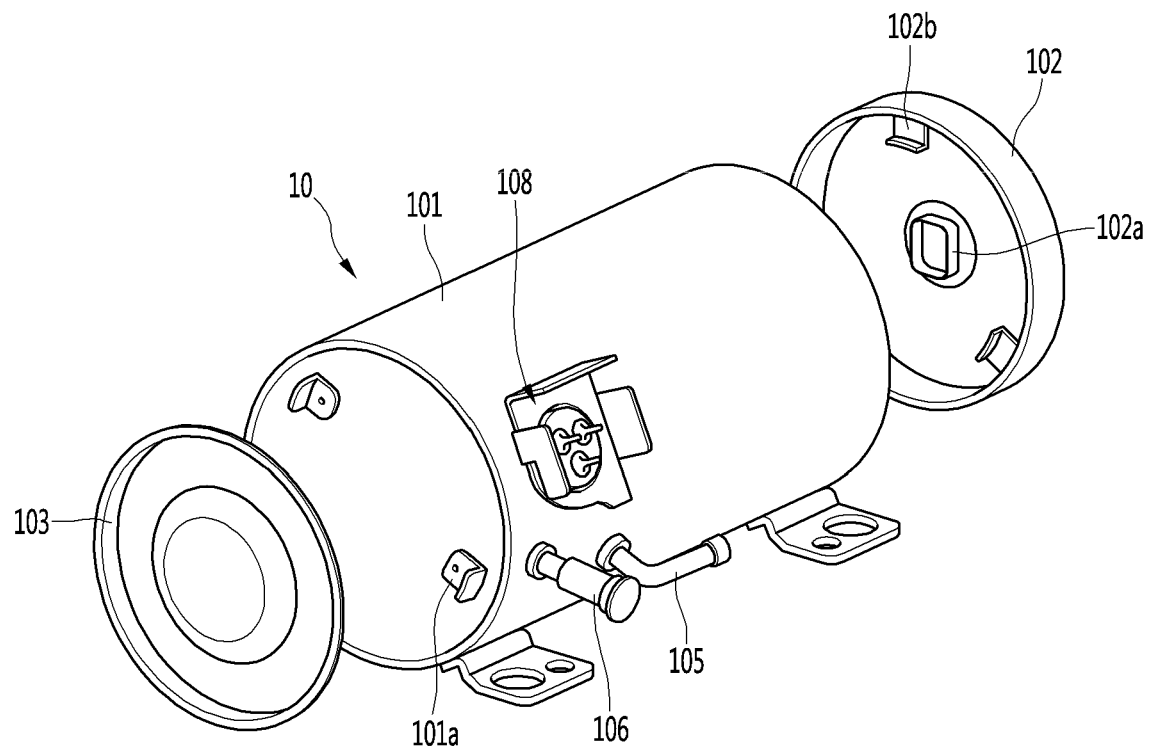
FIG. 2 is a view illustrating a state in which a shell and a shell cover are separated from each other in the linear compressor of FIG. 1.

FIG. 1 is a perspective view of a linear compressor according to a first embodiment, and FIG. 2 is a view illustrating a state in which a shell and a shell cover are separated from each other in the linear compressor of FIG. 1.

Referring to FIGS. 1 and 2, a linear compressor 10 according to a first embodiment includes a shell 101 and shell covers 102 and 103 coupled to the shell 101. In a broad sense, each of the shell covers 102 and 103 may be understood as one component of the shell 101.

A leg 50 may be coupled to a lower portion of the shell 101. The leg 50 may be coupled to a base of a product in which the linear compressor 10 is installed. For example, the product may include a refrigerator, and the base may include a machine room base of the refrigerator. For another example, the product may include an outdoor unit of an air conditioner, and the base may include a base of the outdoor unit.

The shell 101 may have an approximately cylindrical shape and be disposed to lie in a horizontal direction or an axial direction. In FIG. 1, the shell 101 may extend in the horizontal direction and have a relatively low height in a radial direction. That is, since the linear compressor 10 has a low height, for example, when For example the linear compressor 10 is installed in the machine room base of the refrigerator, a machine room may be reduced in height.

A terminal 108 may be installed on an outer surface of the shell 101. The terminal 108 may be understood as a component for transferring external power to a motor assembly (see reference numeral 140 of FIG. 3) of the linear compressor 10. Particularly, the terminal 108 may be connected to a lead line of a coil (see reference numeral 141c of FIG. 3).

A bracket 109 is installed outside the terminal 108. The bracket 109 may include a plurality of brackets surrounding the terminal 108. The bracket 109 may protect the terminal 108 against an external impact and the like.

Both sides of the shell 101 may be opened. The shell covers 102 and 103 may be coupled to both the opened sides of the shell 101. In detail, the shell covers 102 and 103 include a first shell cover 102 coupled to one opened side of the shell 101 and a second shell cover 103 coupled to the other opened side of the shell 101. An inner space of the shell 101 may be sealed by the shell covers 102 and 103.

In FIG. 1, the first shell cover 102 may be disposed at a right portion of the linear compressor 10, and the second shell cover 103 may be disposed at a left portion of the linear compressor 10. That is to say, the first and second shell covers 102 and 103 may be disposed to face each other.

The linear compressor 10 further includes a plurality of pipes 104, 105, and 106, which are provided in the shell 101 or the shell covers 102 and 103 to suction, discharge, or inject the refrigerant.

The plurality of pipes 104, 105, and 106 include a suction pipe 104 through which the refrigerant is suctioned into the linear compressor 10, a discharge pipe 105 through which the compressed refrigerant is discharged from the linear compressor 10, and a process pipe through which the refrigerant is supplemented to the linear compressor 10.

For example, the suction pipe 104 may be coupled to the first shell cover 102. The refrigerant may be suctioned into the linear compressor 10 through the suction pipe 104 in an axial direction.

The discharge pipe 105 may be coupled to an outer circumferential surface of the shell 101. The refrigerant suctioned through the suction pipe 104 may flow in the axial direction and then be compressed. Also, the compressed refrigerant may be discharged through the discharge pipe 105. The discharge pipe 105 may be disposed at a position that is closer to the second shell cover 103 than the first shell cover 102.

The process pipe 106 may be coupled to an outer circumferential surface of the shell 101. A worker may inject the refrigerant into the linear compressor 10 through the process pipe 106.

The process pipe 106 may be coupled to the shell 101 at a height different from that of the discharge pipe 105 to avoid interference with the discharge pipe 105. The height is understood as a distance from the leg 50 in the vertical direction (or the radial direction). Since the discharge pipe 105 and the process pipe 106 are coupled to the outer circumferential surface of the shell 101 at the heights different from each other, work convenience may be improved.

At least a portion of the second shell cover 103 may be disposed adjacent to the inner circumferential surface of the shell 101, which corresponds to a point to which the process pipe 106 is coupled. That is to say, at least a portion of the second shell cover 103 may act as flow resistance of the refrigerant injected through the process pipe 106.

Thus, in view of a passage for the refrigerant, the passage for the refrigerant introduced through the process pipe 106 decreases in size by the second shell cover 103 when entering into the inner space of the shell 101 and then increases in size again after passing through the inner space of the shell 101. In this process, a pressure of the refrigerant may be reduced to allow the refrigerant to be vaporized. Also, in this process, an oil component contained in the refrigerant may be separated. Thus, the refrigerant from which the oil component is separated may be introduced into a piston 130 (see FIG. 3) to improve compression performance of the refrigerant. The oil component may be understood as working oil existing in a cooling system.

A cover support part 102a is disposed on an inner surface of the first shell cover 102. A second support device 185 that will be described later may be coupled to the cover support part 102a. The cover support part 102a and the second support device 185 may be understood as devices for supporting a main body of the linear compressor 10. Here, the main body of the linear compressor 10 represents a component provided in the shell 101. For example, the main body may include a driving part that reciprocates forward and backward and a support part supporting the driving part.

The driving part may include components such as the piston 130, a magnet 146, a support 137, and a muffler 150, which will be described later. Also, the support part may include components such as resonant springs 176a and 176b, a rear cover 170, a stator cover 149, a first support device 165, and a second support device 185, which will be described later.

A stopper 102b may be disposed on the inner surface of the first shell cover 102. The stopper 102b may be understood as a component for preventing the main body of the linear compressor 10, particularly, the motor assembly 140 from being bumped by the shell 101 and thus damaged due to the vibration or the impact occurring during the transportation of the linear compressor 10. The stopper 102b may be disposed adjacent to the rear cover 170 that will be described later. Thus, when the linear compressor 10 is shaken, the rear cover 170 may interfere with the stopper 102b to prevent the impact from being transmitted to the motor assembly 140.

A spring coupling part 101a may be disposed on the inner circumferential surface of the shell 101. For example, the spring coupling part 101a may be disposed at a position that is adjacent to the second shell cover 103. The spring coupling part 101a may be coupled to a first support spring 166 of the first support device 165 that will be described later. Since the spring coupling part 101a and the first support device 165 are coupled to each other, the main body of the compressor may be stably supported inside the shell 101.

Figure 3:
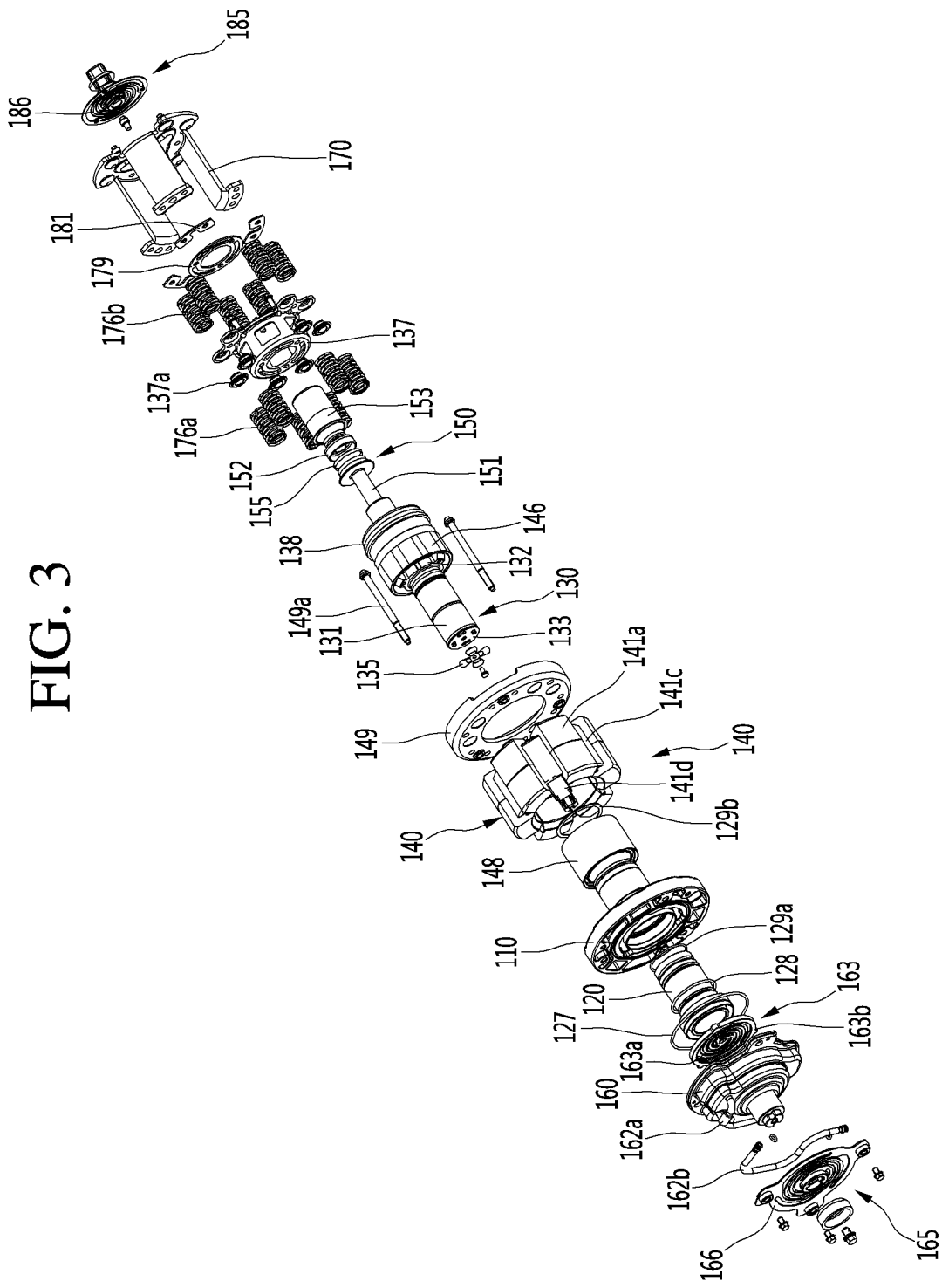
FIG. 3 is an exploded perspective view of a compressor main body accommodated in the shell of the linear compressor according to the first embodiment.
Figure 4:
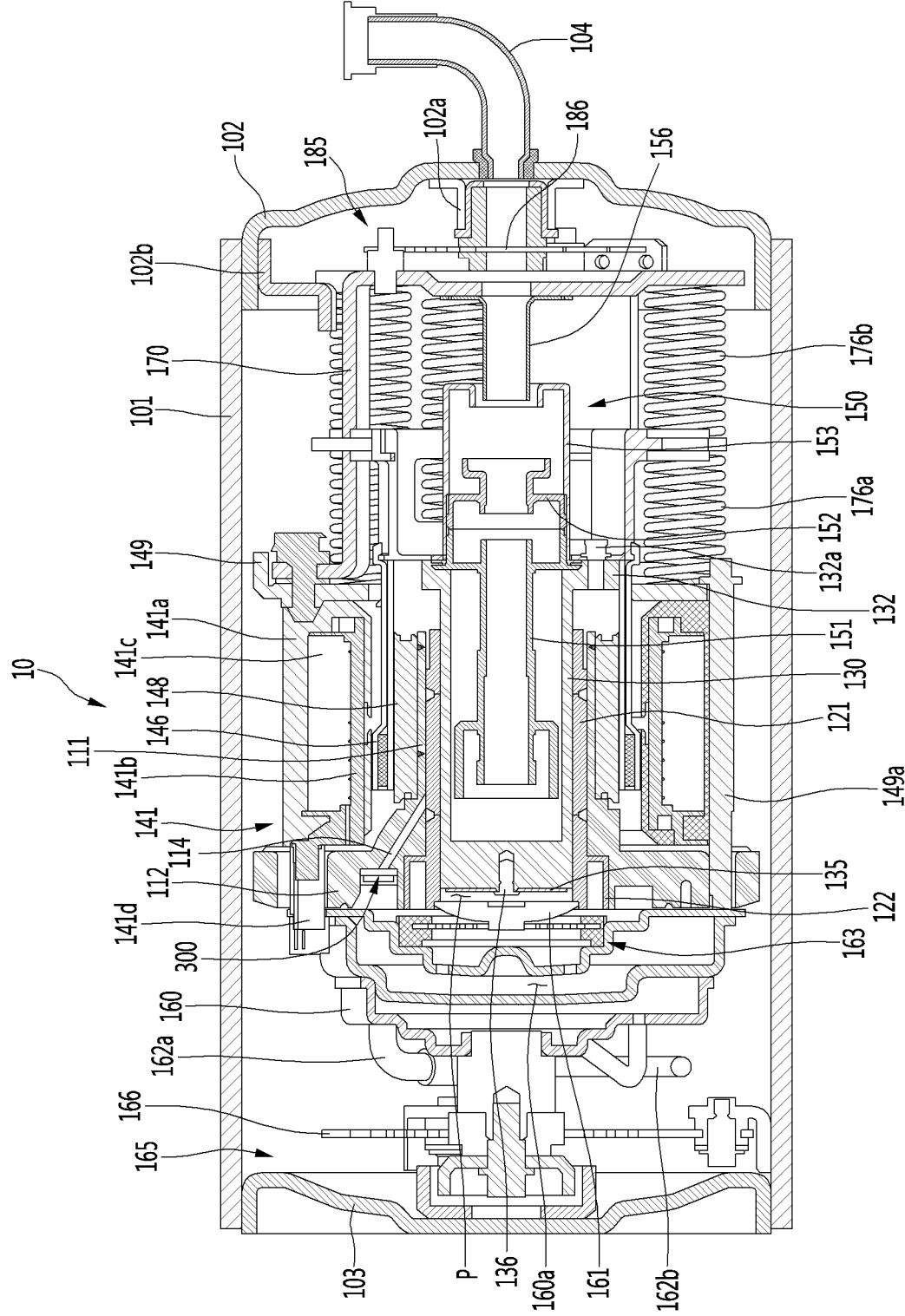
FIG. 4 is a cross-sectional view taken along line IV-IV' of FIG. 1.
Figure 5:
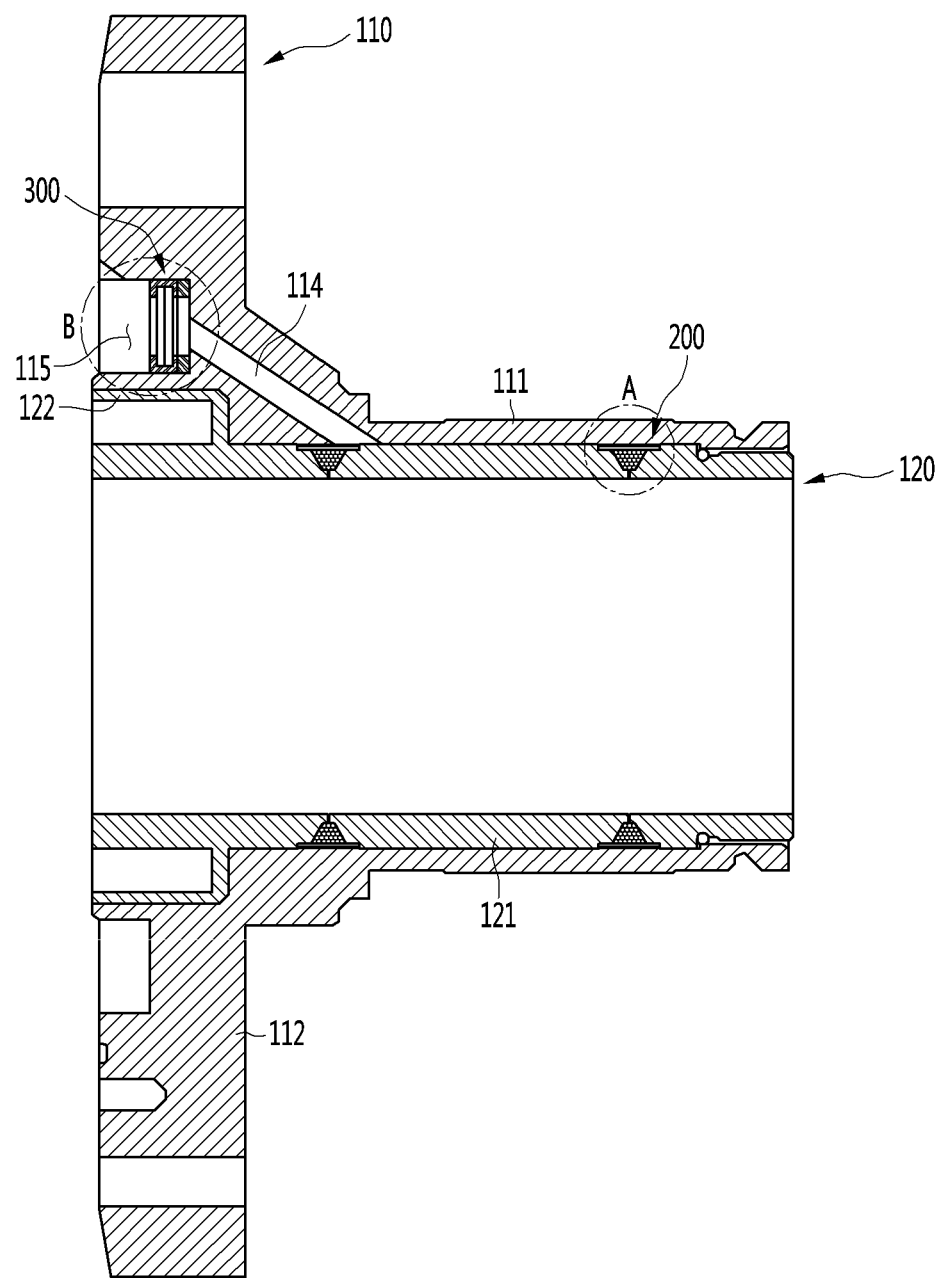
FIG. 5 is a cross-sectional view of a frame and a cylinder according to the first embodiment.

FIG. 3 is an exploded perspective view of the compressor main body accommodated in the shell of the linear compressor according to the first embodiment, and FIG. 4 is a cross-sectional view taken along line IV-IV' of FIG. 1. FIG. 5 is a cross-sectional view of a frame and a cylinder according to the first embodiment.

Referring to FIGS. 3 to 5, the linear compressor 10 according to an embodiment includes a cylinder 120 provided in the shell 101, a piston 130 that linearly reciprocates within the cylinder 120, and a motor assembly 140 that functions as a linear motor for applying driving force to the piston 130. When the motor assembly 140 is driven, the piston 130 may linearly reciprocate in the axial direction.

Also, the linear compressor 10 further include a suction muffler 150 coupled to the piston 130 to reduce a noise generated from the refrigerant suctioned through the suction pipe 104. The refrigerant suctioned through the suction pipe 104 flows into the piston 130 via the suction muffler 150. For example, while the refrigerant passes through the suction muffler 150, the flow noise of the refrigerant may be reduced.

The suction muffler 150 includes a plurality of mufflers 151, 152, and 153. The plurality of mufflers 151, 152, and 153 include a first muffler 151, a second muffler 152, and a third muffler 153, which are coupled to each other.

The first muffler 151 is disposed within the piston 130, and the second muffler 152 is coupled to a rear side of the first muffler 151. Also, the third muffler 153 accommodates the second muffler 152 therein and extends to a rear side of the first muffler 151. In view of a flow direction of the refrigerant, the refrigerant suctioned through the suction pipe 104 may successively pass through the third muffler 153, the second muffler 152, and the first muffler 151. In this process, the flow noise of the refrigerant may be reduced.

The suction muffler 150 further includes a muffler filter 155. The muffler filter 155 may be disposed on an interface on which the first muffler 151 and the second muffler 152 are coupled to each other. For example, the muffler filter 155 may have a circular shape, and an outer circumferential portion of the muffler filter 155 may be supported between the first and second mufflers 151 and 152.

Hereinafter, the direction will be defined.

The "axial direction" may be understood as a direction in which the piston 130 reciprocates, i.e., the horizontal direction in FIG. 4. Also, in the axial direction", a direction from the suction pipe 104 toward a compression space P, i.e., a direction in which the refrigerant flows may be defined as a "front direction", and a direction opposite to the front direction may be defined as a "rear direction". When the piston 130 moves forward, the compression space P may be compressed.

On the other hand, the "radial direction" may be understood as a direction that is perpendicular to the direction in which the piston 130 reciprocates, i.e., the vertical direction in FIG. 4.

The piston 130 includes a piston body 131 having an approximately cylindrical shape and a piston flange 132 extending from the piston body 131 in the radial direction. The piston body 131 may reciprocate inside the cylinder 120, and the piston flange 132 may reciprocate outside the cylinder 120.

The cylinder 120 includes a cylinder body 121 extending in the axial direction and a cylinder flange 122 disposed outside a front portion of the cylinder body 121. Also, the cylinder 120 is configured to accommodate at least a portion of the first muffler 151 and at least a portion of the piston body 131.

The cylinder body 121 includes a gas inflow part (see reference numeral 126 of FIG. 6) into which at least a portion of the refrigerant discharged through a discharge valve 161 that will be described later is introduced. The gas inflow part 126 may be recessed inward from an outer circumferential surface of the cylinder body 121 in the radial direction.

The gas inflow part 126 may be provided in plurality. The plurality of gas inflow parts 126 may be disposed to be spaced apart from each other along the outer circumferential surface of the cylinder body 121 with respect to a central axis in the axial direction.

A cylinder filter 200 filtering foreign substances or oil components contained in the refrigerant gas is provided in the gas inflow part 126. The cylinder filter 200 includes a plurality of laminated filters. Also, a flow rate of the refrigerant passing through the cylinder filter 200 may be adjusted through the nozzle provided in the cylinder body 121 so that the refrigerant serves as a gas bearing between the piston 130 and the cylinder 120.

Also, the cylinder 120 has a compression space P in which the refrigerant is compressed by the piston 130. Also, a suction hole 133 through which the refrigerant is introduced into the compression space P is defined in a front surface of the piston body 131, and a suction valve 135 for selectively opening the suction hole 133 is disposed on a front side of the suction hole 133.

Also, a coupling hole 136a to which a predetermined coupling member 136 is coupled is defined in a front surface of the piston body 131. In detail, the coupling hole 136a may be defined in a center of the front surface of the piston body 131, and a plurality of suction holes 133 are defined to surround the coupling hole 136a. Also, the coupling member 136 passes through the suction valve 135 and is coupled to the coupling hole 136a to fix the suction valve 135 to the front surface of the piston body 131.

A discharge cover 160 defining a discharge space 160a for the refrigerant discharged from the compression space P and a discharge valve assembly 161 and 163 coupled to the discharge cover 160 to selectively discharge the refrigerant compressed in the compression space P are provided at a front side of the compression space P. The discharge space 160a includes a plurality of space parts that are partitioned by inner walls of the discharge cover 160. The plurality of space parts are disposed in the front and rear direction to communicate with each other.

The discharge valve assemblies 161 and 163 include a discharge valve 161 that is opened when the pressure of the compression space P is above a discharge pressure to introduce the refrigerant into the discharge space 160a of the discharge cover 160 and a spring assembly 163 disposed between the discharge valve 161 and the discharge cover 160 to provide elastic force in the axial direction.

The spring assembly 163 includes a valve spring 163a and a spring support part 163b for supporting the valve spring 163a to the discharge cover 160. For example, the valve spring 163a may include a plate spring. Also, the spring support part 163b may be integrally injection-molded to the valve spring 163a through an injection-molding process.

The discharge valve 161 is coupled to the valve spring 163a, and a rear portion or a rear surface of the discharge valve 161 is disposed to be supported on the front surface of the cylinder 120. When the discharge valve 161 is supported on the front surface of the cylinder 120, the compression space may be maintained in the sealed state. When the discharge valve 161 is spaced apart from the front surface of the cylinder 120, the compression space P may be opened to allow the refrigerant in the compression space P to be discharged.

Thus, the compression space P may be understood as a space defined between the suction valve 135 and the discharge valve 161. Also, the suction valve 135 may be disposed on one side of the compression space P, and the discharge valve 161 may be disposed on the other side of the compression space P, i.e., an opposite side of the suction valve 135.

While the piston 130 linearly reciprocates within the cylinder 120, when the pressure of the compression space P is below the discharge pressure and a suction pressure, the suction valve 135 may be opened to suction the refrigerant into the compression space P. On the other hand, when the pressure of the compression space P is above the suction pressure, the suction valve 135 may compress the refrigerant of the compression space P in a state in which the suction valve 135 is closed.

Also, when the pressure of the compression space P is above the discharge pressure, the valve spring 163a may be deformed forward to open the discharge valve 161. Here, the refrigerant may be discharged from the compression space P into the discharge space 160a. When the discharge of the refrigerant is completed, the valve spring 163a may provide restoring force to the discharge valve 161 to close the discharge valve 161.

The linear compressor 10 further includes a cover pipe 162a coupled to the discharge cover 160 to discharge the refrigerant flowing through the discharge space 160a of the discharge cover 160. For example, the cover pipe 162a may be made of a metal material.

Also, the linear compressor 10 further includes a loop pipe 162b coupled to the cover pipe 162a to transfer the refrigerant flowing through the cover pipe 162a to the discharge pipe 105. The loop pipe 162a may have one side of the loop pipe 162b coupled to the cover pipe 162a and the other side coupled to the discharge pipe 105.

The loop pipe 162b may be made of a flexible material and have a relatively long length. Also, the loop pipe 162b may roundly extend from the cover pipe 162a along the inner circumferential surface of the shell 101 and be coupled to the discharge pipe 105. For example, the loop pipe 162b may have a wound shape.

The linear compressor 10 further includes a frame 110. The frame 110 is understood as a component for fixing the cylinder 120. For example, the cylinder 120 may be press-fitted into the frame 110. Also, each of the cylinder 120 and the frame 110 may be made of aluminum or an aluminum alloy material.

The frame 110 includes a frame body 111 having an approximately cylindrical shape and a frame flange 112 extending from the frame body 111 in the radial direction. The frame body 111 is disposed to surround the cylinder 120. That is, the cylinder 120 may be disposed to be accommodated into the frame 110. Also, the frame flange 112 may be coupled to the discharge cover 160.

Also, a gas hole 114 through which at least a portion of the refrigerant discharged through the discharge valve 161 flows to the gas inflow part 126 is defined in the frame 110. The gas hole 114 communicates with the frame flange 112 and the frame body 111.

Also, a filter assembly 300 for filtering the foreign substances contained in the refrigerant to be introduced into the gas hole 114 is disposed on the frame flange 112. The filter assembly 300 may be installed to be press-fitted into an inner space defined in the frame flange 112.

The motor assembly 140 includes an outer stator 141, an inner stator 148 disposed to be spaced inward from the outer stator 141, and a magnet 146 disposed in a space between the outer stator 141 and the inner stator 148.

The magnet 146 may linearly reciprocate by a mutual electromagnetic force between the outer stator 141 and the inner stator 148. Also, the magnet 146 may be provided as a single magnet having one polarity or be provided by coupling a plurality of magnets having three polarities to each other.

The inner stator 148 is fixed to an outer circumference of the frame body 111. Also, in the inner stator 148, the plurality of laminations are laminated outside the frame 110 in the radial direction.

The outer stator 141 includes coil winding bodies 141b, 141c, and 141d and a stator core 141a. The coil winding bodies 141b, 141c, and 141d include a bobbin 141b and a coil 141c wound in a circumferential direction of the bobbin 141b.

The coil winding bodies 141b, 141c, and 141d further include a terminal part 141d that guides a power line connected to the coil 141c so that the power line is led out or exposed to the outside of the outer stator 141. The terminal part 141d extends to pass through the frame flange 112.

The stator core 141a includes a plurality of core blocks in which a plurality of laminations are laminated in a circumferential direction. The plurality of core blocks may be disposed to surround at least a portion of the coil winding bodies 141b and 141c.

A stator cover 149 may be disposed on one side of the outer stator 141. Here, the outer stator 141 may have one side supported by the frame flange 112 and the other side supported by the stator cover 149. In summary, the frame flange 112, the outer stator 141, and the stator cover 149 are sequentially disposed in the axial direction.

Also, the linear compressor 10 further includes a cover coupling member 149a for coupling the stator cover 149 to the frame flange 112. The cover coupling member 149a may pass through the stator cover 149 to extend forward to the frame 110 and then be coupled to the frame flange 112.

Also, the linear compressor 10 further includes a rear cover 170 coupled to the stator cover 149 to extend backward and supported by the second support device 185.

In detail, the rear cover 170 includes three support legs, and the three support legs may be coupled to a rear surface of the stator cover 149. A spacer 181 may be disposed between the three support legs and the rear surface of the stator cover 149. A distance from the stator cover 149 to a rear end of the rear cover 170 may be determined by adjusting a thickness of the spacer 181.

Also, the linear compressor 10 further includes an inflow guide part 156 coupled to the rear cover 170 to guide an inflow of the refrigerant into the suction muffler 150. At least a portion of the inflow guide part 156 may be inserted into the suction muffler 150.

Also, the linear compressor 10 further includes a plurality of resonant springs 176a and 176b that are adjusted in natural frequency to allow the piston 130 to perform a resonant motion. The driving part that reciprocates within the linear compressor 10 may stably move by the action of the plurality of resonant springs 176a and 176b to reduce the vibration or noise due to the movement of the driving part.

Also, the linear compressor 10 further includes a first support device 165 coupled to the discharge cover 160 to support one side of the main body of the compressor 10. The first support device 165 may be disposed adjacent to the second shell cover 103 to elastically support the main body of the compressor 10. In detail, the first support device 165 includes a first support spring 166. The first support spring 166 may be coupled to the spring coupling part 101a.

Also, the linear compressor 10 further includes a second support device 185 coupled to the rear cover 170 to support the other side of the main body of the compressor 10. The second support device 185 may be coupled to the first shell cover 102 to elastically support the main body of the compressor 10. In detail, the second support device 185 includes a second support spring 186. The second support spring 186 may be coupled to the cover support part 102a.

Also, the linear compressor 10 includes the frame 110 and a plurality of sealing members for increasing coupling force between the peripheral components around the frame 110. Each of the plurality of sealing members may have a ring shape.

In detail, the plurality of sealing members include a first sealing member 127 disposed at a portion at which the frame 110 and the discharge cover 160 are coupled to each other. Also, the plurality of sealing members further include second and third sealing members 128 and 129a provided to portions at which the frame 110 and the cylinder 120 are coupled to each other and a fourth sealing member 129b provided at a portion at which the frame 110 and the inner stator 148 are coupled to each other.

Hereinafter, the cylinder filter according to the first embodiment will be described in detail with reference to the accompanying drawings.

Figure 6:
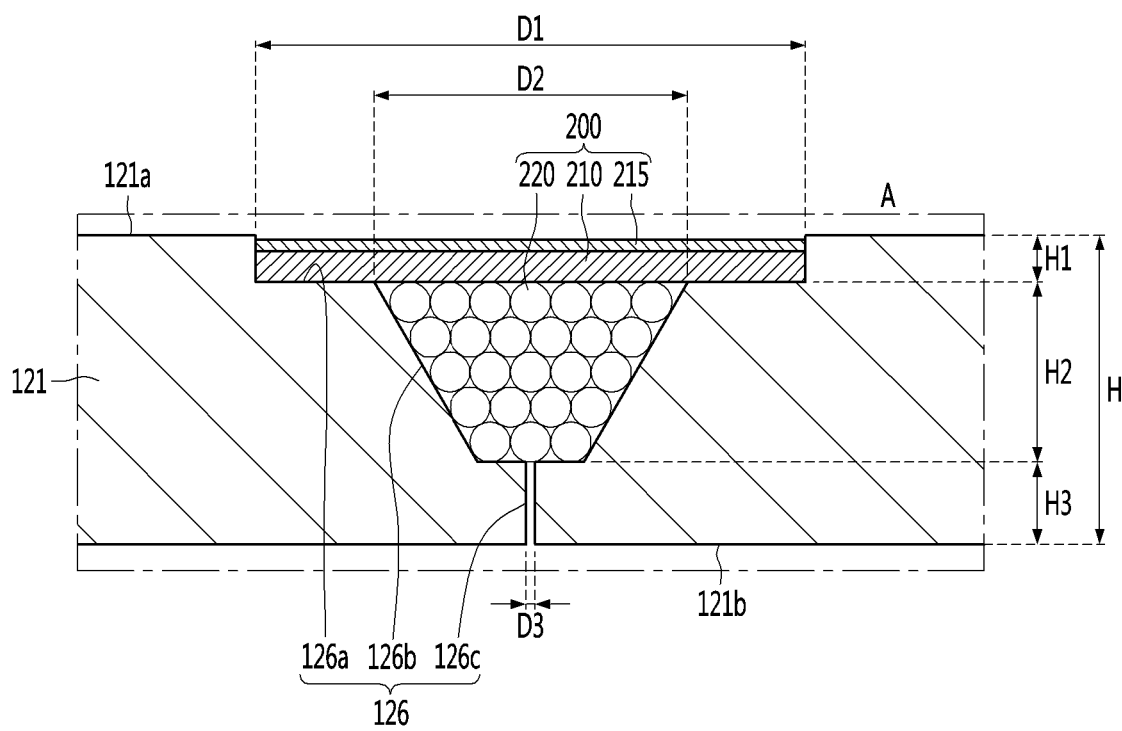
FIG. 6 is an enlarged view illustrating a portion "A" of FIG. 5.

FIG. 6 is an enlarged view illustrating a portion "A" of FIG. 5.

Referring to FIGS. 5 and 6, the linear compressor 10 further includes a cylinder filter coupled to the cylinder 120.

The cylinder 120 includes a cylinder body 121 and a cylinder flange 122 disposed outside the front of the cylinder body 121.

The cylinder body 121 may have a hollow cylindrical shape that lengthily extends in a horizontal direction or an axial direction. Also, the piston 130 is disposed in the cylinder body 121, and the frame 110 is disposed outside the cylinder body 121.

The gas inflow part 126 recessed inward from the outer circumferential surface 121a of the cylinder body 121 in the radial direction is provided in the cylinder 120. Also, a cylinder filter 200 that will be described later is disposed on the gas inflow part 126. The gas inflow part 126 is a space into which at least a portion of the refrigerant discharged through the discharge valve 161 is introduced into the cylinder body 121.

The gas inflow part 126 may be continuously provided along a circumference of the cylinder body 121. That is, the gas inflow part 126 may be recessed inward along the circumference of the cylinder body 121 in the radial direction. Here, the gas inflow part 126 may have a circular band shape along the outer circumferential surface 121a of the cylinder body 121 with respect to a central axis thereof in the axial direction.

The gas inflow part 126 may be provided in plurality. The plurality of gas inflow parts 126 may be disposed to be spaced apart from the cylinder body 121 in the axial direction.

In detail, the gas inflow part 126 includes a first recess part 126a recessed by a predetermined depth H inward along a circumference of the outer circumferential surface 121a of the cylinder body 121 in the radial direction, a second recess part 126b further recessed by a predetermined depth H2 inward from the first recess part 126a in the radial direction, and a nozzle 126c further recessed by a predetermined depth H3 inward from the second recess part 126b in the radial direction.

That is, the first recess part 126a, the second recess part 126b, and the nozzle 126 may communicate with each other. Here, the nozzle 126c may pass from the inside of the second recess part 126b up to the inner circumferential surface 121b of the cylinder body 121. Thus, the refrigerant gas introduced from the first recess part 126a may pass through the second recess part 126b and then move to the inside of the cylinder 120 through the nozzle 126c.

The first recess part 126a may be understood as a space in which a first filter that will be described later is installed. For this, the first recess part 126a may be recessed along the outer circumference of the cylinder body 121 to have a relatively large width Dl. The first recess part 126a may have a circular band shape along the outer circumferential surface 121a of the cylinder body 121 with respect to a central axis thereof in the axial direction.

The second recess part 126b may be understood as a space in which a second filter that will be described later is installed. For this, the second recess part 126b may be further recessed inward from a bottom surface of the first recess part 126a in the radial direction. The second recess part 126b may be recessed along a circumference of the first recess part 126a.

Here, the second recess part 126b may have a width D2 less than that Dl of the first recess part 126a. Particularly, the second recess part 126b may have an area that is gradually narrowed inward in the radial direction.

Also, the second recess part 126b may be recessed in a circular shape along a central point of the circumference of the first recess part 126a. Thus, centers of the first filter and the second filter may match each other.

The nozzle 126c may be understood as a passage through which the refrigerant gas passing through the first filter and the second filter is introduced into the cylinder 120. The nozzle 126c may pass from a bottom surface of the second recess part 126b up to the inner circumferential surface 121b of the cylinder body 121.

The nozzle 126c may have a width or diameter D3 that is relatively less than that of the second recess part 126b. For example, the nozzle 126c may have a width or diameter of about 20 μm to about 40 μm.

Also, the nozzle 126c may be surrounded in a circular shape along the circumference of the bottom surface of the second recess part 126b. Here, the nozzle 126c may have a circular shape along a central point of the bottom surface of the second recess part 126b. Thus, centers of the second filter and the nozzle 126c may match each other.

A length H of the cylinder body 121 in a thickness direction may be defined as the sum of the recessed depths H1, H2, and H3 of the first recess part 126a, the second recess part 126b, and the nozzle 126c.

Here, the recessed depth H1 of the first recess part 126a may be less than that H2 of the second recess part 126b. Also, the recessed depth H2 of the second recess part 126b may be greater than that H3 of the nozzle 126c. For example, a ratio of each of the recessed depths H1, H2, and H3 to the length H of the cylinder body 121 in the thickness direction may be designed at a ratio of 0.16:0.44:0.4.

The cylinder filter 200 may include a first filter 210 and a second filter 220 installed at an outlet-side of the first filter 210.

The first filter 210 may be made of a metal material and seated on the first recess part 126a. The first filter 210 is disposed to be press-fitted into the first recess part 126a. The first filter 210 may include a metal fiber filter.

For example, the first filter 210 may be made of stainless steel. Thus, the first filter 210 may have a predetermined magnetic property and be prevented from being rusted. Also, the first filter 210 may be provided into a mesh type having a plurality of filter holes (not shown). For example, the filter hole may be designed to be a size of about 3 µm or less.

That is, the first filter 210 may be made of a porous metal material. Thus, the filter performance of the first filter 210 may be deteriorated even though a pressure and temperature are sharply changed for a long time.

The second filter 220 includes a PET filter. The PET filter may be configured to adsorb fine particles and oil components contained in the refrigerant. For example, the second filter 220 may include polyethylene phthalate (PET) and polytetrafluoroethylene (PTFE) membranes.

A surface of the first filter 210 may be oil-repellent coated.

In detail, a surface (top surface) corresponding to an inlet-side of the first filter 210 may be oil-repellent coated to reduce a surface area of oil disposed on an inlet surface of the first filter 210. That is, the reason in which the surface of the first filter 210 is oil-repellent coated is for preventing the oil from being spread by increasing surface tension of the oil. When the oil is not relatively spread, an occurrence of a phenomenon in which a filter hole defined in the first filter 210 is blocked by the oil may be reduced.

Here, the first filter 210 may be oil-repellent coated by using an oil-repellent agent. Thus, an oil-repellent coating layer 215 may be provided on an outer surface of the first filter 210, and thus, the surface area of the oil may be reduced by the oil-repellent coating layer 215.

In summary, the cylinder filter 200 may have a structure in which the oil-repellent coating layer 215, the first filter 210, and the second filter 220 are sequentially laminated. Thus, the surface area of the oil may be reduced by the oil-repellent coating layer 215. Therefore, the oil contained in the refrigerant may be filtered by the oil-repellent coating layer 215 to prevent the oil from being permeated into the filter.

Hereinafter, a filter assembly according to the first embodiment will be described in detail with reference to the accompanying drawings.

Figure 7:
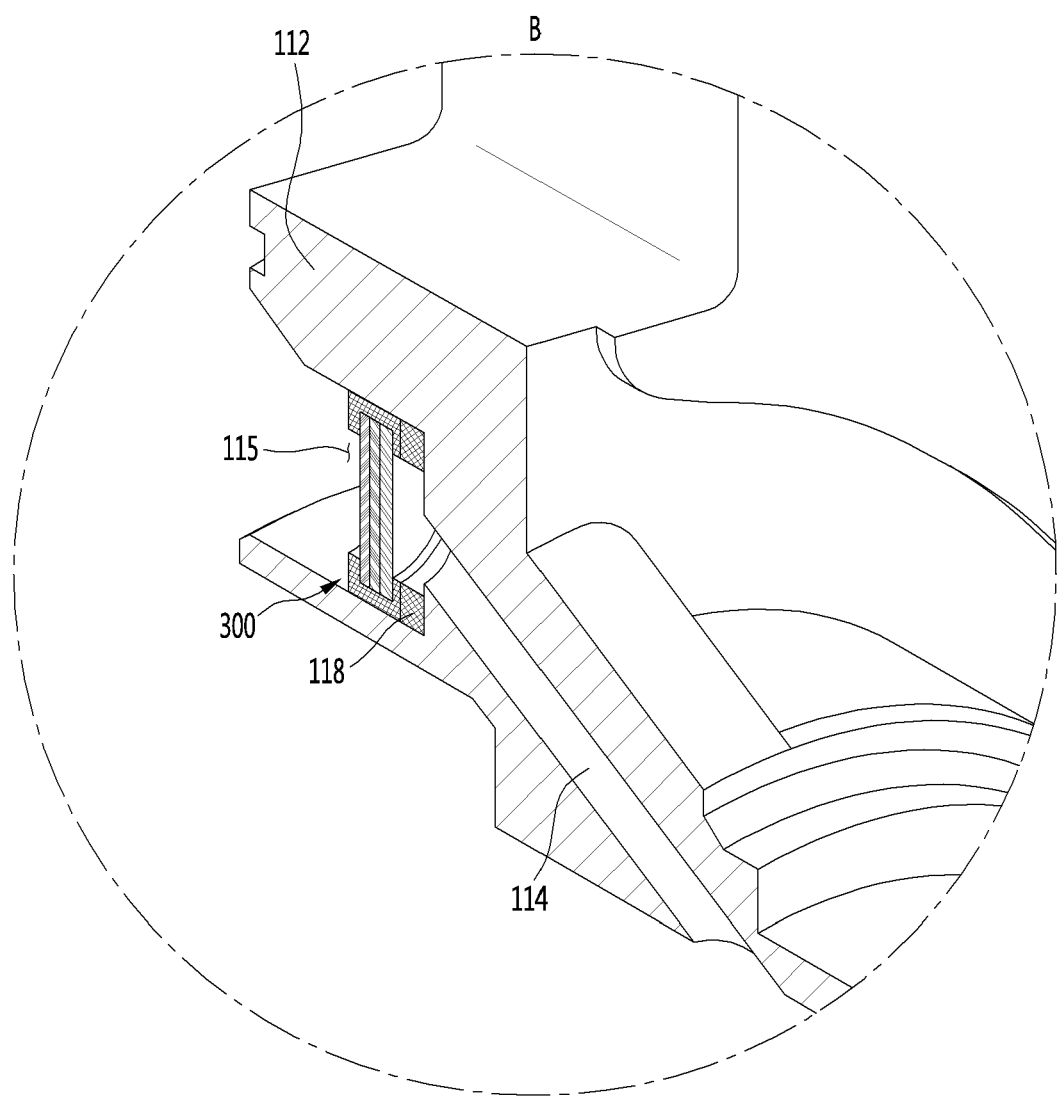
FIG. 7 is an enlarged view illustrating a portion "B" of FIG. 5.
Figure 8:
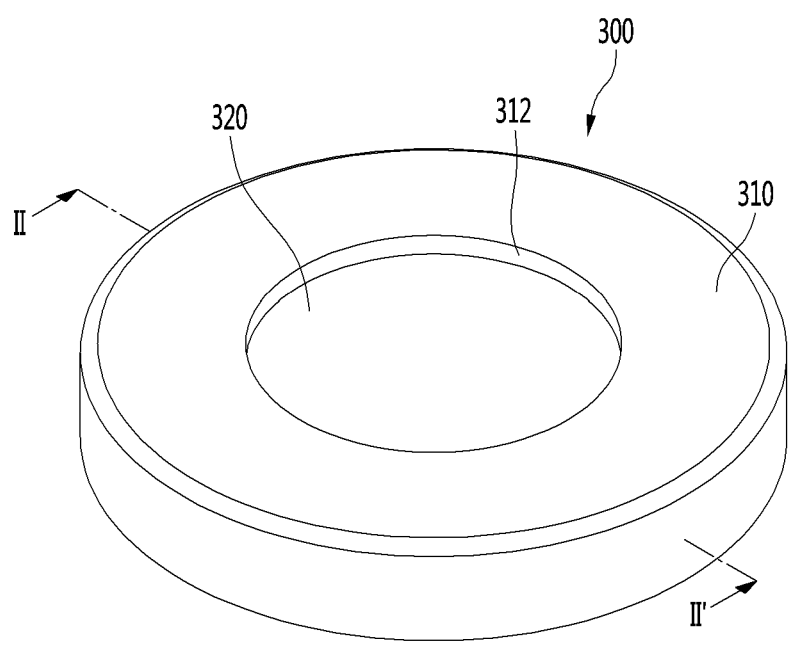
FIG. 8 is a view illustrating a filter assembly according to the first embodiment.
Figure 9:
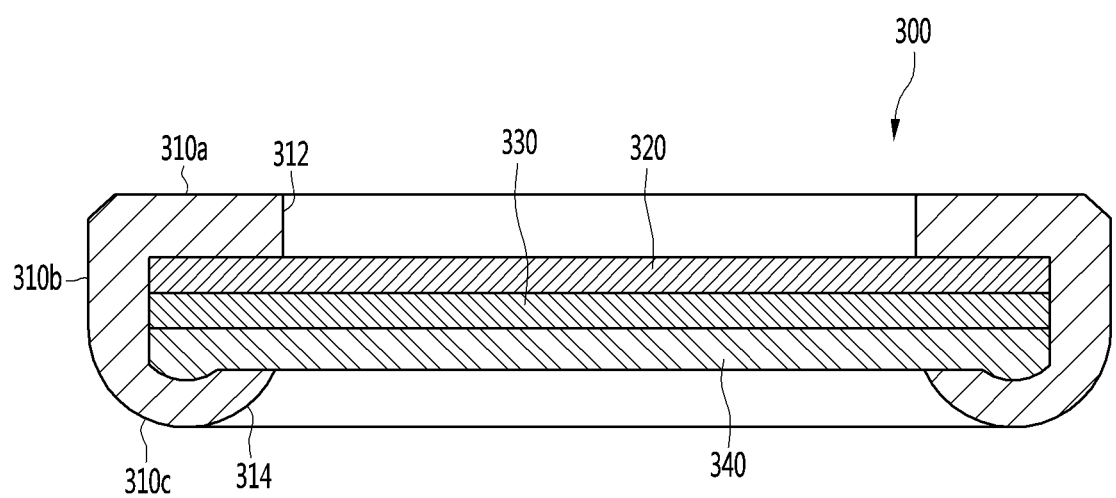
FIG. 9 is a cross-sectional view taken along line II-II' of FIG. 8.
Figure 10:
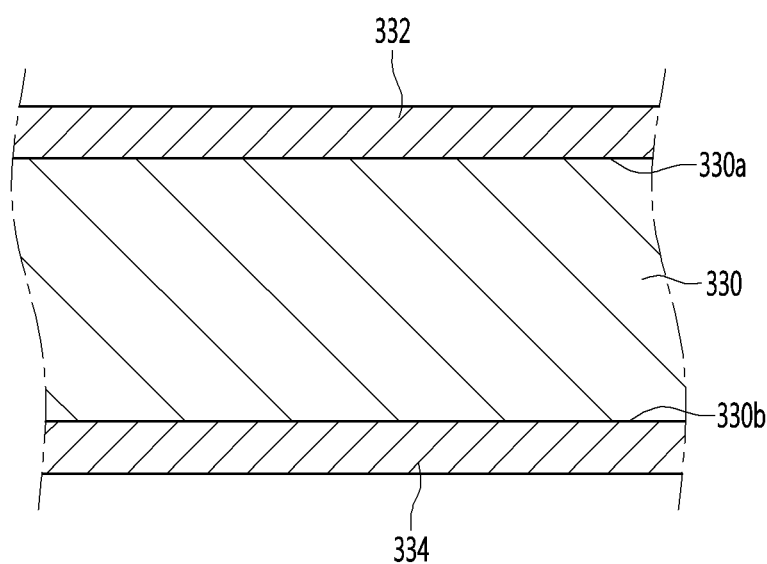
FIG. 10 is a view illustrating a discharge filter of the filter assembly according to the first embodiment.

FIG. 7 is an enlarged view illustrating a portion "B" of FIG. 5, FIG. 8 is a view illustrating a filter assembly according to the first embodiment, FIG. 9 is a cross-sectional view taken along line II-II' of FIG. 8, and FIG. 10 is a view illustrating a discharge filter of the filter assembly according to the first embodiment.

Referring to FIGS. 7 and 10, the linear compressor 10 further includes a filter assembly 300 coupled to the frame 110.

Particularly, a filter groove 115 that is recessed backward from a front surface of the frame flange 112 is defined in the frame flange 112. The filter groove 115 may have a cylindrical shape.

Also, the filter assembly 300 is disposed inside the filter groove 115. The filter assembly 300 may be press-fitted to be fixed to the filter groove 115.

Also, the linear compressor 10 may further include a filter sealing member 118 installed at the rear of the filter assembly 30, i.e., an outlet-side of the filter assembly 30.

The filter sealing member 118 may have an approximately ring shape.

In detail, the filter sealing member 118 may be placed on the filter groove 117. When the filter assembly 300 presses the filter groove 115, the filter sealing member 118 may be press-fitted into the filter groove 117. Thus, coupling force of the filter assembly 300 may increase by the filter sealing member 118. In addition, foreign substances existing in the shell 101, for example, oil or fine particles may be prevented from being permeated into the refrigerant passing through the filter assembly 300 by the filter sealing member 118.

The filter assembly 300 includes a filter frame 310 having opened front and rear portions.

A refrigerant inlet part 312 through which the refrigerant existing in the filter groove 115 is introduced into the filter frame 310 may be provided in the opened front portion of the filter frame 310. Also, a refrigerant discharge part 314 through which the refrigerant passing through the filter assembly 300 is discharged to the outside of the filter frame 310 is provided in the opened rear portion of the filter frame 310.

The filter frame 310 may have a cylindrical case shape of which both sides are opened by the refrigerant inlet part 312 and the refrigerant discharge part 314. For example, the filter frame 310 may be made of a brass material.

In detail, the filter frame 310 includes a first frame 310a providing the refrigerant inlet part 312 and extending from the refrigerant inlet part 312 to the outside in the radial direction, a second frame 310b extending backward from the first frame 310a, and a third frame 310c extending inward from the second frame 310b in the radial direction to provide the refrigerant discharge part 314.

Each of the first and third frames 310a and 310c may have an approximately ring shape. Also, a rear surface of the third frame 310c may be rounded and configured to press the filter sealing member 118.

Also, the filter assembly 300 further includes a discharge filter 330 provided in the filter frame 310 and filter support members 320 and 340 supporting the discharge filter 330.

The discharge filter 330 includes a filter having lipophilicity.

For example, the discharge filter 330 may be made of a PET material having lipophilicity. Thus, oil contained in the refrigerant introduced into the filter assembly 300 may be filtered by the discharge filter 330 and thus may not pass through the filter assembly 300.

Also, at least one or more surfaces of the discharge filter 330 may be oil-repellent coated. The reason in which the surface of the discharge filter 330 is oil-repellent coated is for preventing the oil from being spread by increasing surface tension of the oil. When the oil is not relatively spread, an occurrence of a phenomenon in which a filter hole defined in the discharge filter 330 is blocked by the oil may be reduced.

In detail, one surface of a front surface 330a and a rear surface 330b of the discharge filter 330 may be oil-repellent coated. Here, the front surface 330a and the rear surface 330b of the discharge filter 330 may be oil-repellent coated by using the oil-repellent agent.

That is, an oil-repellent coating layer 332 may be disposed on the front surface 330a of the discharge filter 330. Also, an oil-repellent coating layer 334 may be disposed on the rear surface 330b of the discharge filter 330. Thus, since the oil-repellent coating layer is provided on the front surface 330a or the rear surface 330b of the discharge filter 330, the oil contained in the refrigerant may not pass through the discharge filter 330.

Thus, the oil or foreign substances contained in the refrigerant gas may be previously filtered before the refrigerant gas is introduced into the cylinder nozzle to effectively prevent the nozzle from being blocked.

The filter support members 320 and 340 include a first support member 320 disposed at the inlet-side of the discharge filter 330 to support the discharge filter 330 and a second support member 340 disposed at the outlet-side of the discharge filter 330 to support the discharge filter 330. The first support member 320 or the second support member 340 may include a fine metal mesh.

One side of the first support member 320 may be supported by the first frame 310a, and the other side of the first support member 320 may support the discharge filter 330. Also, one side of the second support member 340 may be supported by the third frame 310c, and the other side of the second support member 340 may support the discharge filter 330. The discharge filter 330 may be installed between the first and second support members 320 and 340 and thus be stably supported.

Alternatively, one side of the first support member 320 may be supported by the first frame 310a, and the other side of the first support member 320 may support the oil-repellent coating layer 332 provided on the front surface 330a of the discharge filter 330. Also, one side of the second support member 340 may be supported by the third frame 310c, and the other side of the second support member 320 may support the oil-repellent coating layer 334 provided on the rear surface 330b of the discharge filter 330.

Thus, the discharge filter 330 may be firmly fixed due to the above-described configuration. In addition, the oil contained in the refrigerant introduced into the refrigerant inlet part 312 of the filter frame 310 may not pass through the discharge filter 330 to prevent the nozzle provided in the cylinder from being blocked.

Figure 11:
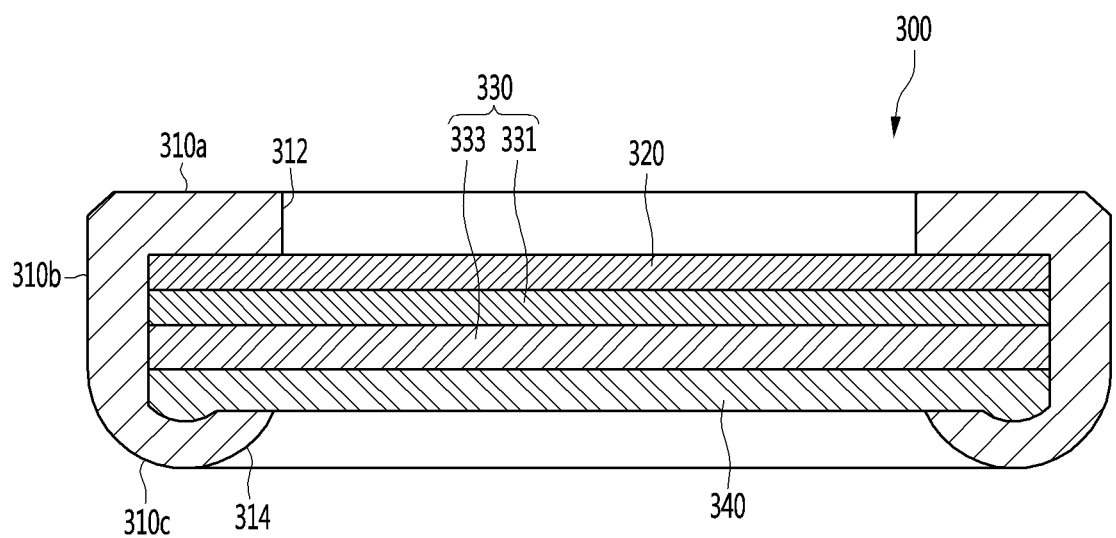
FIG. 11 is a cross-sectional view of a filter assembly according to a second embodiment.
Figure 12:
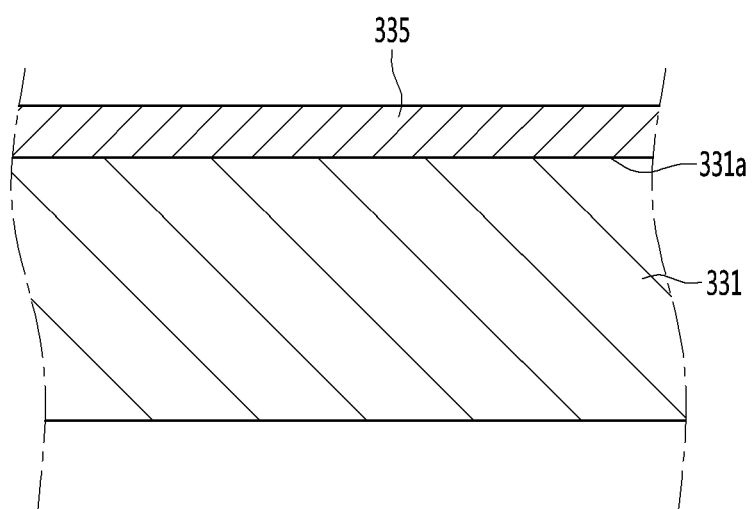
FIG. 12 is a view illustrating a discharge filter of the filter assembly according to the second embodiment.

FIG. 11 is a cross-sectional view of a filter assembly according to a second embodiment, and FIG. 12 is a view illustrating a discharge filter of the filter assembly according to the second embodiment.

The current embodiment is the same as the first embodiment except for a structure of a filter assembly. Thus, only characterized parts of the current embodiment will be principally described below, and descriptions of the same part as that of the first embodiment will be quoted from the first embodiment.

Referring to FIGS. 11 and 12, a filter assembly 300 according to a second embodiment includes a filter frame 310 having opened front and rear portions.

A refrigerant inlet part 312 through which a refrigerant existing in a filter groove 115 is introduced into the filter frame 310 may be provided in the opened front portion of the filter frame 310. Also, a refrigerant outlet part 314 through which the refrigerant passing through the filter assembly 300 is discharged to the outside of the filter frame 310 is provided in the opened rear portion of the filter frame 310.

Also, the filter assembly 300 further includes a discharge filter 330 provided in the filter frame 310 and filter support members 320 and 340 supporting the discharge filter 330. The filter support members 320 and 340 have the same as those according to the first embodiment, and thus, their detailed description will be omitted.

Particularly, in this embodiment, the discharge filter 330 includes a plurality of filters 331 and 333. The plurality of filters 331 and 333 include a first filter 331 and a second filter 333 disposed at an outlet-side of the first filter 331.

The first filter 331 may be a mesh filter made of a metal material. That is, the first filter 331 may include a metal fiber filter having a plurality of filter holes.

For example, the first filter 331 may be formed of stainless steel. Thus, the first filter 210 may have a predetermined magnetic property and be prevented from being rusted. Thus, filter performance of the first filter 331 may be deteriorated even though a pressure and temperature are sharply changed for a long time.

The second filter 333 includes a filter having lipophilicity.

For example, the second filter 330 may be made of a PET material having lipophilicity. Thus, oil contained in the refrigerant introduced into the filter assembly 300 may be filtered by the second filter 333 and thus may not pass through the filter assembly 300.

Also, at least one or more surfaces of the second filter 333 may be oil-repellent coated. That is, the second filter 333 may be the same as the discharge filter according to the foregoing first embodiment.

In this embodiment, an outer surface of the first filter 331 may also be oil-repellent coated.

In detail, the front surface 331a of the first filter 331 may be oil-repellent coated to reduce a surface area of the oil contained in the refrigerant gas. Here, the first filter 331 may be oil-repellent coated by using an oil-repellent agent. That is, an oil-repellent coating layer 335 may be disposed on the front surface 331a of the first filter 331.

In summary, the first filter 331 may be disposed at the rear of the first support member 320, and the second filter 333 may be disposed at the rear of the first filter 331. Also, the second support member 340 may be disposed at the rear of the second filter 333. Also, the oil-repellent coating layer 335 may be disposed between the first support member 320 and the first filter 331 to filter the oil contained in the refrigerant by the first filter 331, and thus, the oil may not pass through the filter assembly 300.

Figure 13:
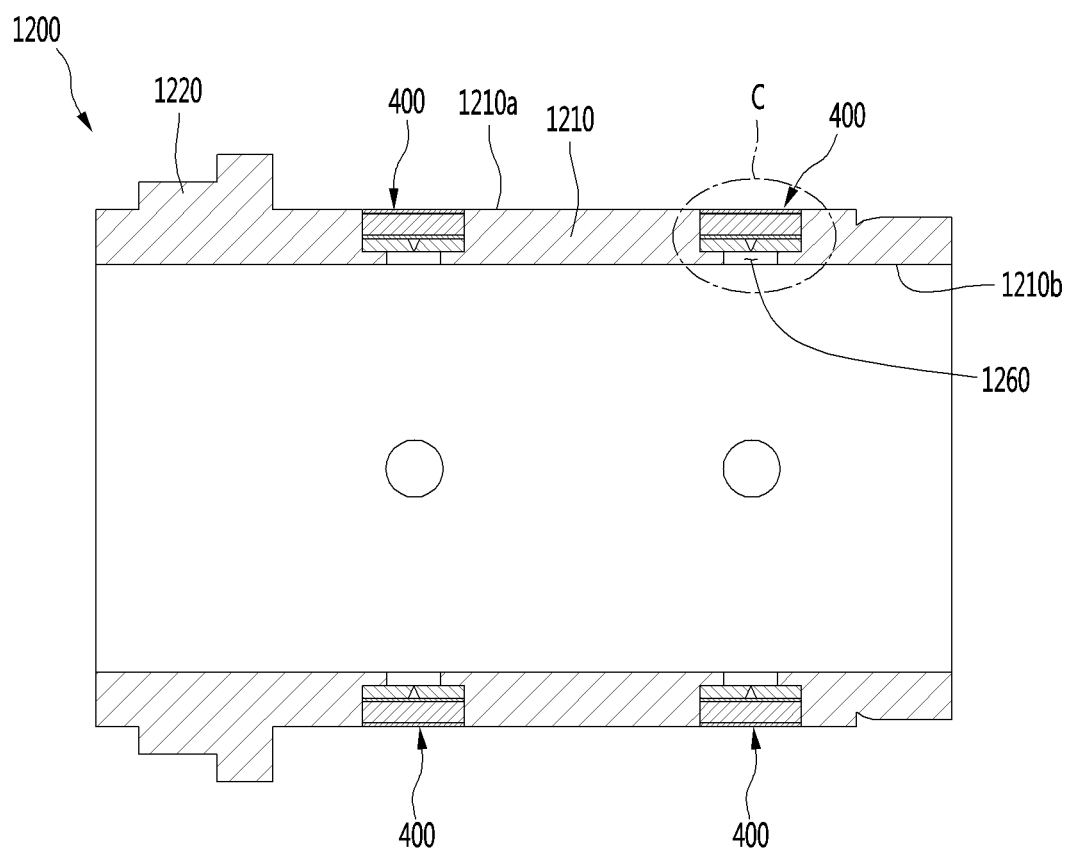
FIG. 13 is a view illustrating a state in which a cylinder filter is provided in a cylinder according to a third embodiment.
Figure 14:
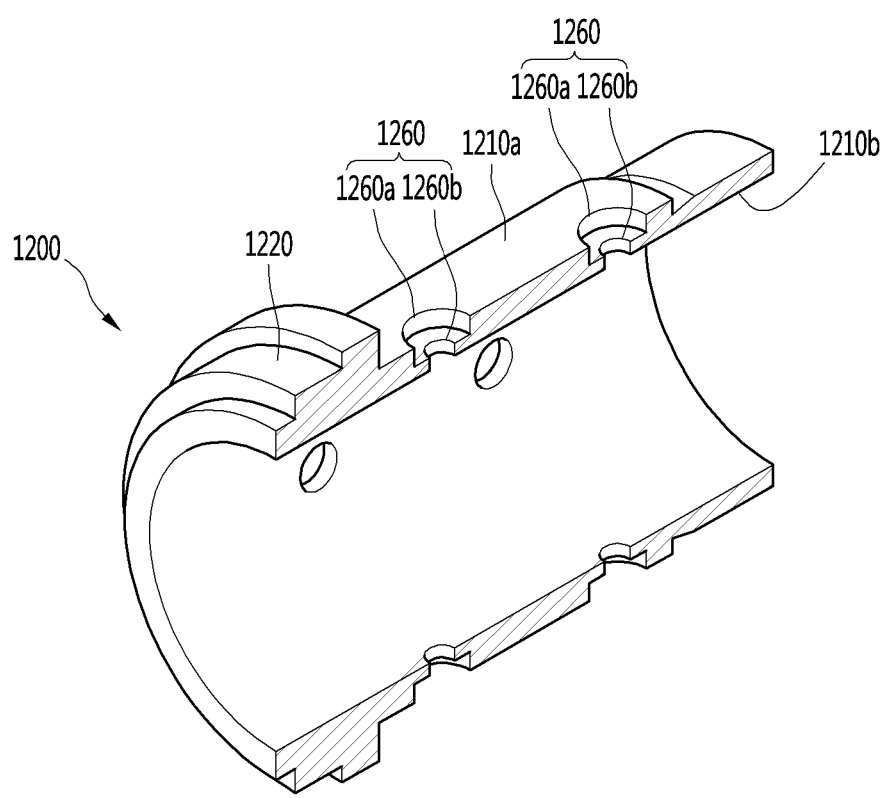
FIG. 14 is a view illustrating a configuration of the cylinder according to the third embodiment.
Figure 15:
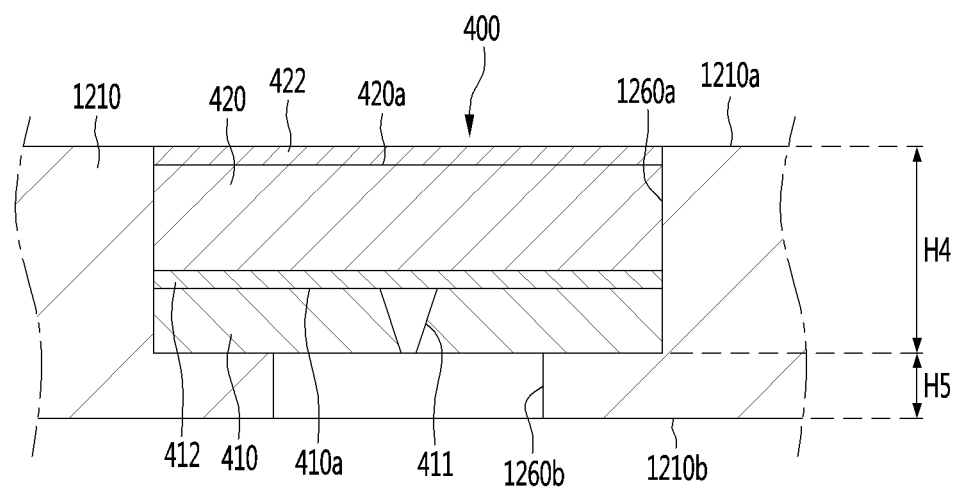
FIG. 15 is an enlarged view of a portion "C" of FIG. 13.

FIG. 13 is a view illustrating a state in which a cylinder filter is provided in a cylinder according to a third embodiment, FIG. 14 is a view illustrating a configuration of the cylinder according to the third embodiment, and FIG. 15 is an enlarged view of a portion "C" of FIG. 13.

Referring to FIGS. 13 to 15, a cylinder 1200 according to a third embodiment includes a cylinder body 1210 and a cylinder flange 1220 disposed outside a front portion of the cylinder body 1210.

The cylinder body 1210 may have a hollow cylindrical shape that lengthily extends in a horizontal direction or an axial direction. Also, the piston 130 is disposed in the cylinder body 1210, and a frame 110 is disposed outside the cylinder body 121.

The cylinder 1200 includes a gas inflow part 1260 passing through the cylinder body 1210. The gas inflow part 1260 may be provided in plurality along a circumference of the cylinder body 1210. The gas inflow part 1260 is a space into which at least a portion of the refrigerant discharged through a discharge valve 161 is introduced into the cylinder body 1210.

The gas inflow part 1260 may pass inward from an outer circumferential surface 1210a of the cylinder body 1210 in the radial direction. That is, the gas inflow part 1260 may be a portion that continuously passes from the outer circumferential surface 1210a of the cylinder body 1210 to an inner circumferential surface 1210b of the cylinder body 1210.

In detail, the gas inflow part 1260 may include a seating groove 1260a that is recessed inward from the outer circumferential surface 1210a of the cylinder body 1210 by a predetermined depth in the radial direction and a through-hole 1260b passing from the seating groove 1260a to the inner circumferential surface 1210b of the cylinder body 1210. That is, the seating groove 1260a may communicate with the through-hole 1260b. However, the seating groove 1260a may have a diameter less than that of the through-hole 1260b.

The seating groove 1260a provides a space in which a cylinder filter 420 that will be described later is mounted. For this, the seating groove 1260a is recessed from the outer circumferential surface 1210a of the cylinder body 1210 by a predetermined depth to define a seating surface on which the cylinder filter 420 is seated.

For example, the seating groove 1260a may have a cylindrical shape. In this case, a horizontal cross-section of the seating surface may have a circular shape to support the cylindrical filter 420.

The through-hole 1260b may be further recessed from the seating groove 1260a by a predetermined depth to extend up to the inner circumferential surface 1210b of the cylinder body 1210. Particularly, the through-hole 1260b passes from a central portion of the seating surface to the inner circumferential surface 1210b of the cylinder body 1210.

Here, since the through-hole 1260b has a diameter less than that of the seating groove 1260a, a seating surface on which the cylinder filter 420 is seated may be provided.

The through-hole 126b may have a circular shape. Thus, the refrigerant gas passing through the cylinder filter 420 may be uniformly spread into the space between the piston 130 and the cylinder 1200 through the through-hole 1260b.

The gas inflow part 1260 may be provided in plurality, which are spaced apart from each other along an outer surface of the cylinder 1200. For example, the plurality of gas inflow parts 1260 may be disposed to be spaced apart from each other along the outer circumferential surface 1210a of the cylinder body 1210 with respect to a central axis in the axial direction.

The plurality of gas inflow parts 1260 may be disposed at a certain interval along the circumference of the cylinder 1200. However, this embodiment is not limited thereto. For example, the gas inflow parts 1260 may be variously designed in number and position.

The linear compressor 10 further include a plate 410 installed on the cylinder 1200.

The plate 410 may be seated on the seating groove 1260a to cover the through-hole 1260b. Also, the plate 410 may support a cylinder filter 420 that will be described later.

Here, the plate 410 and the cylinder filter 420 may be called a cylinder filter assembly 400.

The plate 410 may have a disc shape having a predetermined area. Also, a nozzle 411 for adjusting a flow rate of the refrigerant may be provided in the plate 410.

The nozzle 411 may be provided to pass through a predetermined point of the plate 410. Preferably, the nozzle 411 may pass through a central point of the top surface of the plate 410 in a downward direction.

For example, the nozzle 411 may have an area that is gradually narrowed inward in the radial direction. Thus, an inner end of the nozzle 411 may provide a tip portion. Thus, the flow rate of the refrigerant gas may be adjusted by the diameter of the nozzle 411.

Particularly, a surface (a top surface or a bottom surface) of the plate 410 may be oil-repellent coated.

In detail, the top surface 410a of the plate 410 may be oil-repellent coated to reduce a surface area of oil contained in the refrigerant gas. Here, the plate 410 may be oil-repellent coated by using an oil-repellent agent. Thus, an oil-repellent coating layer 412 may be provided on the top surface of the plate 410, and thus, surface tension of the oil may increase by the oil-repellent coating layer 412. Thus, the oil may not be spread on the top surface 410a of the plate 410 to prevent the nozzle 411 provided in the plate 410 from being blocked by the oil.

Also, the linear compressor 10 further include a cylinder filter 420 installed in the cylinder 1200.

The cylinder filter 420 is seated on the seating groove 1260a to filter the foreign substances or oil contained in the refrigerant gas. The cylinder filter 420 is made of a metal material and seated on the plate 410. The cylinder filter 420 may be disposed to be press-fitted into the seating groove 1260a.

For example, the cylinder filter 420 may be made of stainless steel. Also, the cylinder filter 420 may have a magnetic property and be prevented from being rusted. Also, the cylinder filter 420 may be provided into a mesh type having a plurality of filter holes (not shown). For example, the filter hole may be designed to be a size of about 3 μm or less.

That is, the cylinder filter 420 may be made of a porous metal material. Thus, filter performance of the cylinder filter 420 may be deteriorated even though a pressure and temperature are sharply changed for a long time.

Particularly, a surface (a top surface or a bottom surface) of the cylinder filter 420 may be oil-repellent coated.

In detail, the top surface 420a of the cylinder filter 420 may be oil-repellent coated to reduce a surface area of the oil contained in the refrigerant gas. Here, the cylinder filter 420 may be oil-repellent coated by using an oil-repellent agent. Thus, an oil-repellent coating layer 422 may be provided on the top surface 420a of the cylinder filter 420, and thus, the surface tension of the oil may increase by the oil-repellent coating layer 422. Thus, the oil may not be spread on the top surface 420a of the cylinder filter 420 to prevent the nozzle hole provided in the cylinder filter 420 from being blocked by the oil.

In summary, the surface (top surface or bottom surface) of the plate 410 or the surface (top surface or bottom surface) of the cylinder filter 420 may be oil-repellent coated, and thus, the oil contained in the refrigerant may be prevented from being introduced into the nozzle 411 provided in the plate 410. That is, if even any one of the plate 410 and the cylinder filter 420 is oil-repellent coated, the oil may be prevented from being introduced into the nozzle 411.

The linear compressor including the above-described constituents according to the embodiment may have the following effects.

First, the nozzle through which the refrigerant gas passes may be provided in the cylinder, and the cylinder filter of which at least one or more surfaces are oil-repellent coated may be provided at the inlet-side of the nozzle to adjust the flow rate of the refrigerant gas that is used as the gas bearing and also filter the foreign substances contained in the refrigerant gas. Thus, although the nozzle through which the refrigerant gas is introduced into the cylinder is minimized in diameter or number, the blocking of the nozzle may be prevented while maintaining the performance of the gas bearing. Thus, although the consumption flow rate of the refrigerant gas is relatively smaller than that of the refrigerant gas according to the related art, the piston supporting force equal to or greater than that according to the related art may be secured.

Second, the cylinder filter provided at the inlet-side of the cylinder nozzle may be oil-repellent coated to effectively prevent the nozzle from being blocked without changing the structure of the existing compressor, thereby reducing the product price and improving general versatility.

Third, the cylinder filter may include the plurality of filters made of materials different from each other, and the plurality of filters may be laminated in the flow direction of the refrigerant. Thus, the oil or foreign substances contained in the refrigerant gas may be effectively filtered.

Fourth, the discharge filter that is oil-repellent coated may be provided in the frame through which the refrigerant gas is introduced into the cylinder nozzle to previously filer the oil or foreign substances contained in the refrigerant gas before the refrigerant gas is introduced into the cylinder nozzle, thereby effectively prevent the nozzle from being blocked.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A linear compressor comprising:
   a shell;
   a cylinder that is disposed in the shell and that defines a compression space configured to receive and discharge refrigerant;
   a piston disposed in the cylinder and configured to reciprocate relative to the cylinder;
   a gas inflow part recessed inward from an outer circumferential surface of the cylinder in a radial direction and configured to supply a portion of the refrigerant discharged from the compression space toward the piston, the gas inflow part comprising a nozzle that extends to an inner circumferential surface of the cylinder; and
   a cylinder filter disposed at an inlet-side of the nozzle in the cylinder, one or more surfaces of the cylinder filter being oil-repellent coated,
   wherein the cylinder filter comprises:
      a first filter disposed inside the gas inflow part, the first filter having an inlet-side and an outlet-side disposed radially inward of the inlet-side with respect to the cylinder, and
      a second filter disposed at the outlet-side of the first filter,
   wherein the first filter comprises a metal fiber having a plurality of filter holes, and
   wherein the second filter comprises a polyethylene terephthalate (PET) material.

2. The linear compressor according to claim 1, wherein a surface of the first filter at the inlet-side is the one or more surfaces of the cylinder filter being oil-repellent coated.

3. The linear compressor according to claim 1, wherein the first filter is laminated on the second filter, and
   wherein an outlet-side of the second filter is connected to the inlet-side of the nozzle.

4. The linear compressor according to claim 1, wherein the gas inflow part further comprises:
   a first recess part configured to seat the first filter and recessed inward from the outer circumferential surface of the cylinder in the radial direction; and
   a second recess part configured to seat the second filter and recessed inward from the first recess part in the radial direction.

5. The linear compressor according to claim 4, wherein the first recess part has a circular band shape extending along the outer circumferential surface of the cylinder, and
   wherein the second recess part is recessed inward from a central region of a bottom surface of the first recess part in the radial direction.

6. The linear compressor according to claim 4, wherein a recessed depth of the first recess part from the outer circumferential surface of the cylinder is less than a recessed depth of the second recess part from a bottom surface of the first recess part.

7. The linear compressor according to claim 5, wherein a cross-sectional area of the second recess part decreases toward the compression space in the radial direction, and
   wherein a bottom surface of the second recess part is connected to the inlet-side of the nozzle.

8. The linear compressor according to claim 1, further comprising a frame disposed outside of the cylinder, the frame comprising: a frame body that accommodates the cylinder and that extends in an axial direction of the cylinder; a frame flange that extends from the frame body in the radial direction of the cylinder; and a frame connection part that extends from the frame flange to the frame body and that defines a gas hole therein.

9. The linear compressor according to claim 8, further comprising a filter assembly disposed at an inlet-side of the gas hole and configured to filter foreign substances from refrigerant introduced toward the gas hole,
   wherein the frame flange defines a filter groove recessed rearward from a front surface of the frame flange and configured to seat the filter assembly.

10. The linear compressor according to claim 9, wherein the filter assembly comprises:
    a filter bracket comprising a refrigerant inlet part and a refrigerant outlet part, the filter bracket defining an accommodation space therein;
    a discharge filter disposed in the accommodation space of the filter bracket, the discharge filter being lipophilic;
    a first support member disposed in the accommodation space of the filter bracket, the first support member being disposed at an inlet-side of the discharge filter; and
    a second support member disposed in the accommodation space of the filter bracket, the second support member being disposed at an outlet-side of the discharge filter.

* * * * *